United States Patent [19]
Aybay et al.

[11] Patent Number: 6,003,104
[45] Date of Patent: Dec. 14, 1999

[54] HIGH SPEED MODULAR INTERNAL MICROPROCESSOR BUS SYSTEM

[75] Inventors: Gunes Aybay, Sunnyvale; Sandeep Aggarwal, Santa Cruz; David Penry, Sunnyvale, all of Calif.

[73] Assignee: Sun Microsystems, Inc., Palo Alto, Calif.

[21] Appl. No.: 09/002,014

[22] Filed: Dec. 31, 1997

[51] Int. Cl.[6] .............................. G06F 13/40; G06F 13/38; G06F 13/364

[52] U.S. Cl. ........................... 710/126; 710/107; 710/129

[58] Field of Search .................................. 710/126, 129, 710/131, 268, 48, 128, 101, 107, 113, 36, 33, 240; 370/351, 360, 423, 489; 340/825.79; 709/300

[56] References Cited

U.S. PATENT DOCUMENTS

| | | | |
|---|---|---|---|
| 5,499,239 | 3/1996 | Munter ..................................... | 370/423 |
| 5,561,669 | 10/1996 | Lenney et al. ........................... | 370/352 |
| 5,630,077 | 5/1997 | Krein et al. .............................. | 710/113 |
| 5,832,245 | 11/1998 | Gulick ..................................... | 710/129 |
| 5,848,279 | 12/1998 | Wu et al. ................................. | 710/268 |

*Primary Examiner*—Gopal C. Ray
*Attorney, Agent, or Firm*—Pennie & Edmonds LLP

[57] ABSTRACT

A CPU of a microprocessor includes a common bus, a bus interface unit (BIU), and a plurality of module units. The BIU has a plurality of first ports coupled to respective first ports of the module units via dedicated buses therebetween and has a second port coupled to a first port of the common bus. The module units each include a second port coupled to respective second ports of the common bus. Communication between the module units is routed through and controlled by the BIU. To request a transaction, a module unit (the initiator) sends a request to the BIU via its dedicated bus to the BIU. The BIU arbitrates among present requests and, in response thereto, grants the arbitration winner's request and transmits a command to the target of the requested transaction. Preferably, both of these signals being are transmitted via the dedicated buses. Thereafter, data is routed from, for instance, the target, to the BIU via a corresponding dedicated bus. The BIU then routes the data to the initiator via the common bus.

29 Claims, 10 Drawing Sheets

HIGH SPEED MODULAR INTERNAL MICROPROCESSOR BUS SYSTEM

CROSS-REFERENCE TO RELATED APPLICATIONS

This application is related to commonly owned U.S. patent applications Ser. No. 09/001,825, entitled "APPARATUS AND METHOD FOR CONTROLLING DATA, ADDRESS, AND ENABLE BUSES WITHIN A MICROPROCESSOR" and Ser. No. 09/001,451, entitled "APPARATUS AND METHOD FOR ABRITRATING TRANSACTIONS REQUIRING MULTIPLE ADDRESSES," both filed on the same day as the present application.

BACKGROUND

1. Field of Invention

This invention relates generally to a central processing unit of a microprocessor and specifically to a bus system within such a central processing unit.

2. Description of Related Art

In a typical microprocessor based computer system, module units within the central processing unit (CPU) such as, for instance, instruction caches, data caches, a DRAM memory controller, a Peripheral Component Interconnect (PCI) interface unit, and so on, communicate with one another via a common bus. Typically, each of the module units communicates with the common bus through a tri-state I/O driver which, in turn, is controlled by a central bus controller. Since the common bus handles only one transaction at a time, a bus control system is necessary to arbitrate control of the common bus to the module units in a manner which optimizes CPU performance. See, for instance, U.S. Pat. No. 5,590,380 to Yamada et al and U.S. Pat. No. 5,528,767 to Chen. In some bus control and arbitration systems, bus control is granted to a particular module unit until the present transaction is completed. In other systems, bus control is granted for a predetermined period of time, regardless of whether the present transaction is completed. Most conventional bus control and arbitration systems have an interrupt feature whereby bus control is immediately granted to a specific unit such as, for instance, the memory controller when it is desired to receive streamline audio video information from an external source, e.g., the Internet.

Unfortunately, conventional bus control and arbitration systems undesirably limit CPU performance. For instance, the transmission and reception of data to and from each module unit during a transaction is controlled by the tri-state I/O drivers within the module units. The tri-state drivers, in turn, are controlled by the central bus controller. Thus, when a transaction requires data and control signals to be sent back and forth between two module units, the tri-state drivers within these two module units must first alert the central bus controller which, in response thereto, provides control signals back to the tri-state drivers. This command hierarchy consumes an undesirable amount of time and, therefore, undesirably limits CPU performance. In addition, the time required to switch the tri-state drivers between states consumes time and, thus, further limits CPU performance. CPU performance is further limited by the time required to arbitrate among present transaction requests.

SUMMARY

A bus system is disclosed herein which overcomes problems in the prior art discussed above. In accordance with the present invention, a CPU of a microprocessor includes a common bus, a bus interface unit (BIU), and a plurality of module units. The BIU has a plurality of first ports coupled to respective first ports of the module units via dedicated buses therebetween and has a second port coupled to a first port of the common bus. The module units each include a second port coupled to respective second ports of the common bus. Communication between the module units is routed through and controlled by the BIU. To request a transaction, a module unit (the initiator) sends a request to the BIU via its dedicated bus to the BIU. The BIU arbitrates among present requests and, in response thereto, grants the arbitration winner's request and transmits a command to the target of the requested transaction. Both of these signals are transmitted via the dedicated buses. Thereafter, data is routed from the initiator unit to the BIU via a corresponding dedicated bus. The BIU then routes the data to the target unit via the common bus. Since present CPU bus systems do not employ tri-state drivers to control data flow, the timing constraints inherent to such drivers do not degrade the CPU performance of present embodiments.

BRIEF DESCRIPTION OF THE DRAWINGS

Like reference numerals refer to corresponding parts throughout the drawing figures.

Detailed Description

Figure 1:
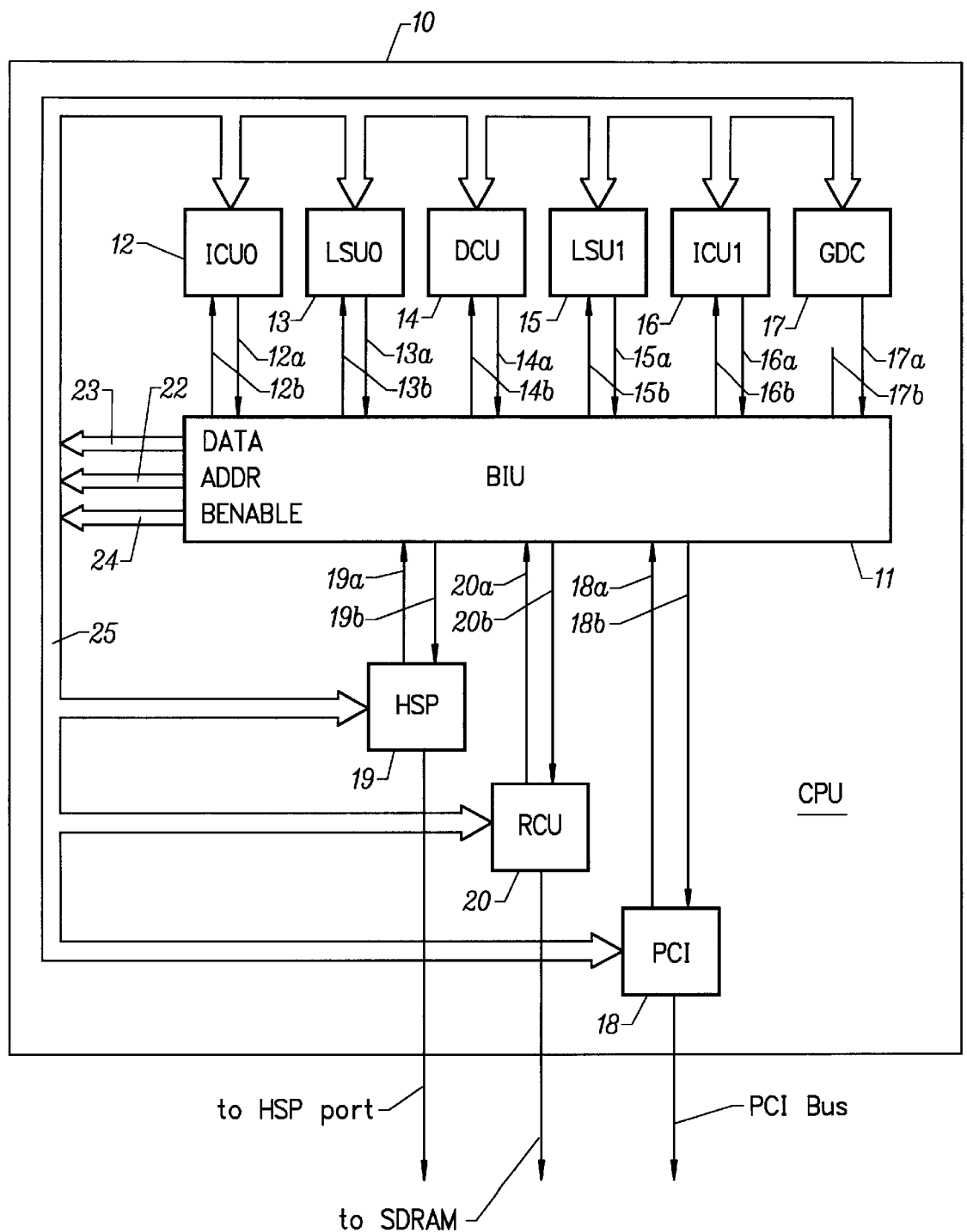
FIG. 1 is a block diagram of a central processing unit (CPU) including a bus system in accordance with an embodiment of the present invention.

Embodiments of the present invention are discussed below in the context of a central processing unit (CPU) 10 within a host microprocessor used, for instance, in a personal computer. Referring to FIG. 1, a CPU 10 constructed in accordance with the present invention includes a bus interface unit (BIU) 11, a first instruction cache unit (ICU0) 12, a first load-store unit (LSU0) 13, a data cache unit (DCU) 14, a second load store unit (LSU1) 15, a second instruction cache unit (ICU1) 16, a geometric decompressor unit (GDC) 17, a peripheral component interconnect (PCI) unit 18, a high speed packet (HSP) protocol unit 19, and an RDRAM control unit (RCU) 20.

The BIU 11 sends address, data, and byte enable signals to module units 12–20 within the CPU 10 via a common address bus 22, a common data bus 23, and a common byte enable bus 24, respectively, collectively shown in FIG. 1 as bus 25. Dedicated buses 12a–20a allow information to be transmitted from respective module units 12–20 directly to the BIU 11 and, conversely, dedicated buses 12b–20b allow information to be transmitted from the BIU 11 directly to each of the respective module units 12–20.

In other embodiments, bidirectional dedicated buses may replace unidirectional buses 12a–20a and 12b–20b. The instruction caches 12 and 16, the load-store units 13 and 15, and the data cache 14 are well known in the art. The PCI unit 18 interfaces between the CPU 10 and a PCI bus of the host microprocessor in a well known manner. The HSP protocol unit 19 interfaces between the CPU 10 and an HSP port (not shown) of the host microprocessor in a known manner. The RCU 20 is of conventional design and interfaces between the CPU 10 and an SDRAM memory (not shown) of the host microprocessor in a well known manner. The PCI unit 18, the HSP unit 19, and the RCU 20 are shared resources which are mapped into CPU memory. Although not shown in FIG. 1, the CPU 10 may include other suitable module units such as, for instance, arithmetic logic units (ALU), multipliers, and so on.

During operation of the host microprocessor, module units 12–20 within the CPU 10 require access to the common address, data, and byte enable buses 22–24 in order to communicate with one another and/or CPU peripheral devices, e.g., the SDRAM memory or the PCI bus. One of units 12–20 requests access to the common buses 22–24 by sending a request signal X_BIU_REQ to the BIU 11 via its dedicated bus, i.e., buses 12a–20a, where X is the initiator of the request. Some requests are accompanied by a byte enable signal, as explained below. The request identifies the type of transaction requested as well as the respective addresses of the initiator and target units. Requests received by the BIU 11 are decoded to determine the target and transaction type and then gated with a ready signal from the target unit, i.e., Y_BIU_BRDY, where Y is the target unit.

If the target is ready to accept a command, as indicated by its ready signal provided to the BIU 11, the request is arbitrated among existing requests according to a two level priority scheme. In a preferred embodiment, the first level includes only the RCU 20, and the second level, which is of lower priority than the first level, includes a round robin rotation of units 12–19. A grant is sent to the unit that "wins" the arbitration. The grant is sent as signal BIU_X_GNT via the appropriate dedicated bus. The BIU 11 also sends a command signal to the target, i.e., BIU_Y_CMD, thereby alerting the target as to the forthcoming transaction. The command signal is preferably transmitted from the BIU 11 to the target unit via the appropriate dedicated bus. The BIU 11 also enables the appropriate common buses 22–24 and selects appropriate address multiplexers associated therewith to facilitate communication between the initiator and target units.

A preferred embodiment is described below with reference to FIGS. 1–7. As mentioned above, the module units 12–20 are directly connected with the BIU 11 via respective dedicated buses 12a–20a, and are selectively connected to the common address bus 22, the common data bus 23, and the common byte enable bus 24 via address, data, and byte enable ports, respectively, associated with the units 12–20. Specifically, each of the dedicated buses 12a–20a allows for its corresponding module unit to communicate address, data, and transaction-related signals to the BIU 11. The transaction related signals include, for instance, requests, data valid signals, commands, byte enable signals, and ready signals. For instance, when requiring access to one of the common buses 22–24, the initiating unit requests a transaction by asserting a request to the BIU 11, i.e., X_BIU_REQ. Here, the BIU 11 monitors ready signals (Y_BIU_BRDY) from each of the units 12–20, where the ready signals indicate whether each of units 12–20 is ready to proceed with a requested transaction.

Figure 2:
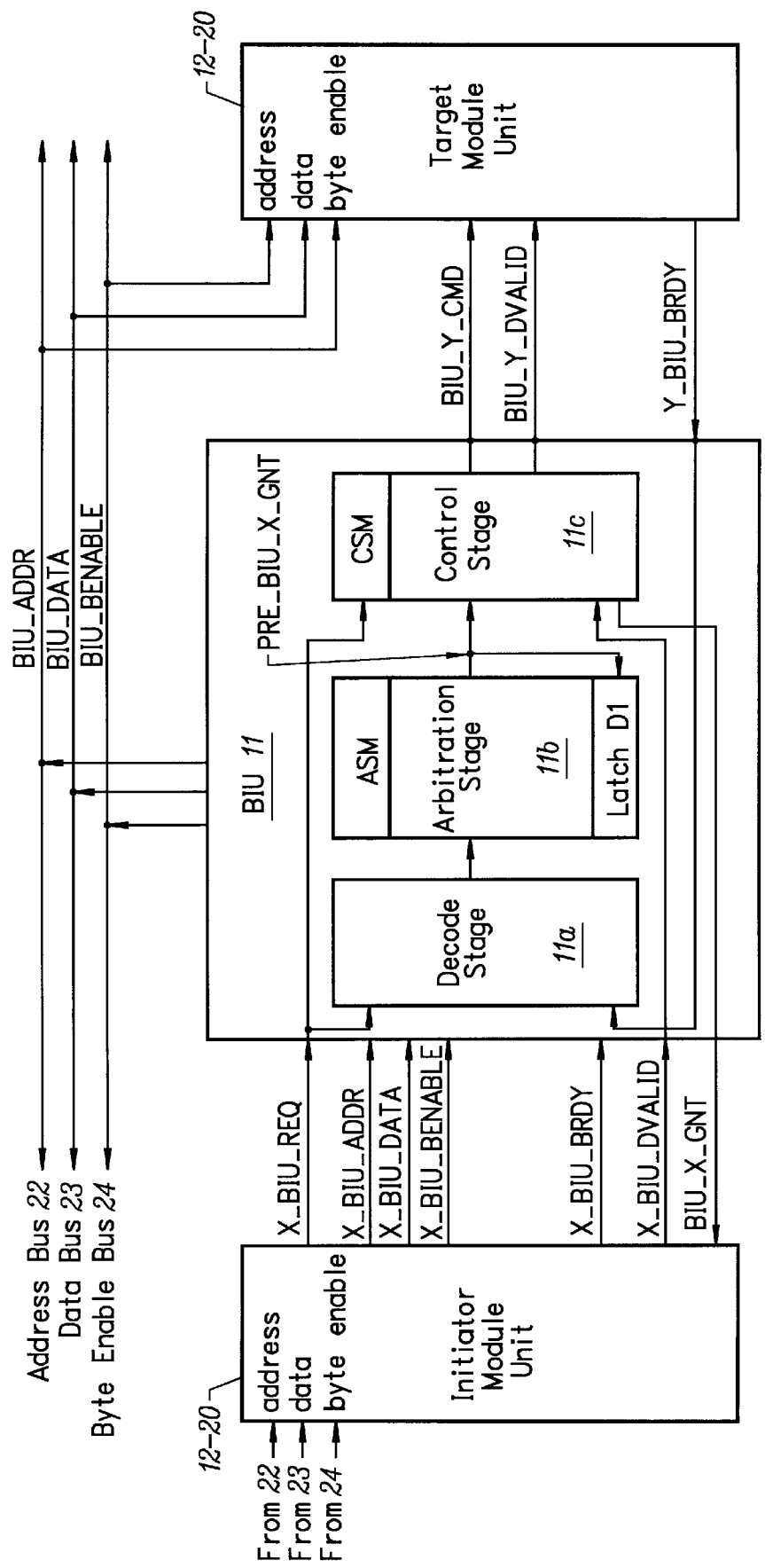
FIG. 2 is a block diagram illustrating one embodiment of a bus interface unit and its connections to module units within the CPU according to the embodiment of FIG. 1.

Referring now to FIG. 2, the request from the initiator, X_BIU_REQ, is received at an input terminal of the BIU 11 and provided to the decode stage 11a. The request is decoded to identify the initiator and target units, and to determine the transaction type requested. In some embodiments, the request includes four fields: TAG, TARGET, TYPE, and BURST, where the TAG field includes special information relating to the requested transaction, e.g., a cache miss, the TARGET field identifies the initiator and target units, the TYPE field identifies the requested transaction type, e.g., Read Begin, Read End, or Write Begin, and the BURST field indicates whether data transfer is burst mode (32 bytes) or non-burst mode (8 bytes). In preferred embodiments, the TYPE field is a two bit field indicating which of the common buses 22–24 are required for the requested transaction.

For instance, most Read Begin transactions require only the common address bus 22, Read End transactions require only the common data bus 23, and most Write Begin transactions require both the common address 22 and data 23 buses. Read Begin and Write Begin transaction initiated by the PCI 18 or either of the LSUs 13 or 15 also require the byte enable bus 24. Once decoded, the request (X_BIU_REQ) is gated with the ready signal from the target unit (Y_BIU_BRDY). If signal Y_BIU_BRDY is active, thereby indicating that the target is ready to receive a command, the decoded request is forwarded to the arbitration stage 11b. In preferred embodiments, the request and target-ready signals are latched outputs from the initiator and targets units, respectively.

The arbitration stage 11b includes an Arbitration State Machine ASM which arbitrates among present requests and grants a winning request on each clock cycle. The ASM is preferably clocked by the CPU clock and utilizes a two-level priority hierarchy where, as mentioned above, the RCU 20 is assigned to level 0 and the remaining units 12–19 are assigned to level 1, where level 0 is of higher priority than level 1. The RCU 20 is given priority over remaining units 12–19 in order to eliminate access delays when retrieving information from computer memory, e.g., SDRAM. If the RCU 20 has not made a request to the BIU 11, the ASM polls the units 12–19 according to a predetermined sequence. An address indicative of the initiator of the winning request is stored within a latch D1 in the arbitration stage 11b, and also forwarded to the control stage 11c as a pre-grant signal PRE_GNT. On the next arbitration which reaches level 1 priority, the ASM again polls units 12–19, beginning with the module unit following, in the predetermined sequence of polling, the previous arbitration winner (the address of which, as mentioned above, is stored in latch D1).

Figure 3:
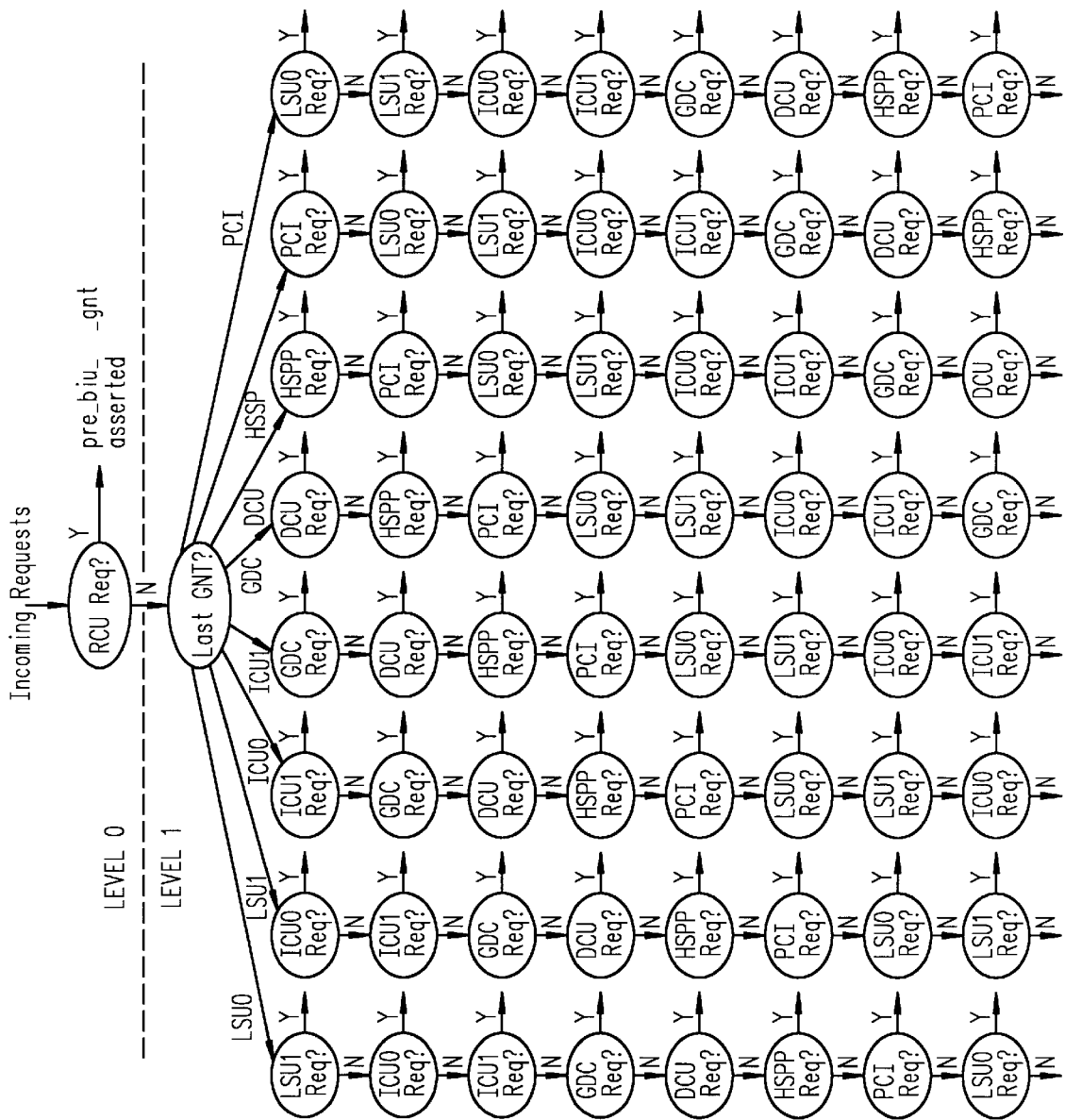
FIG. 3 is a flow chart illustrating a predetermined arbitration sequence according to an embodiment of the present invention.
Figure 4:
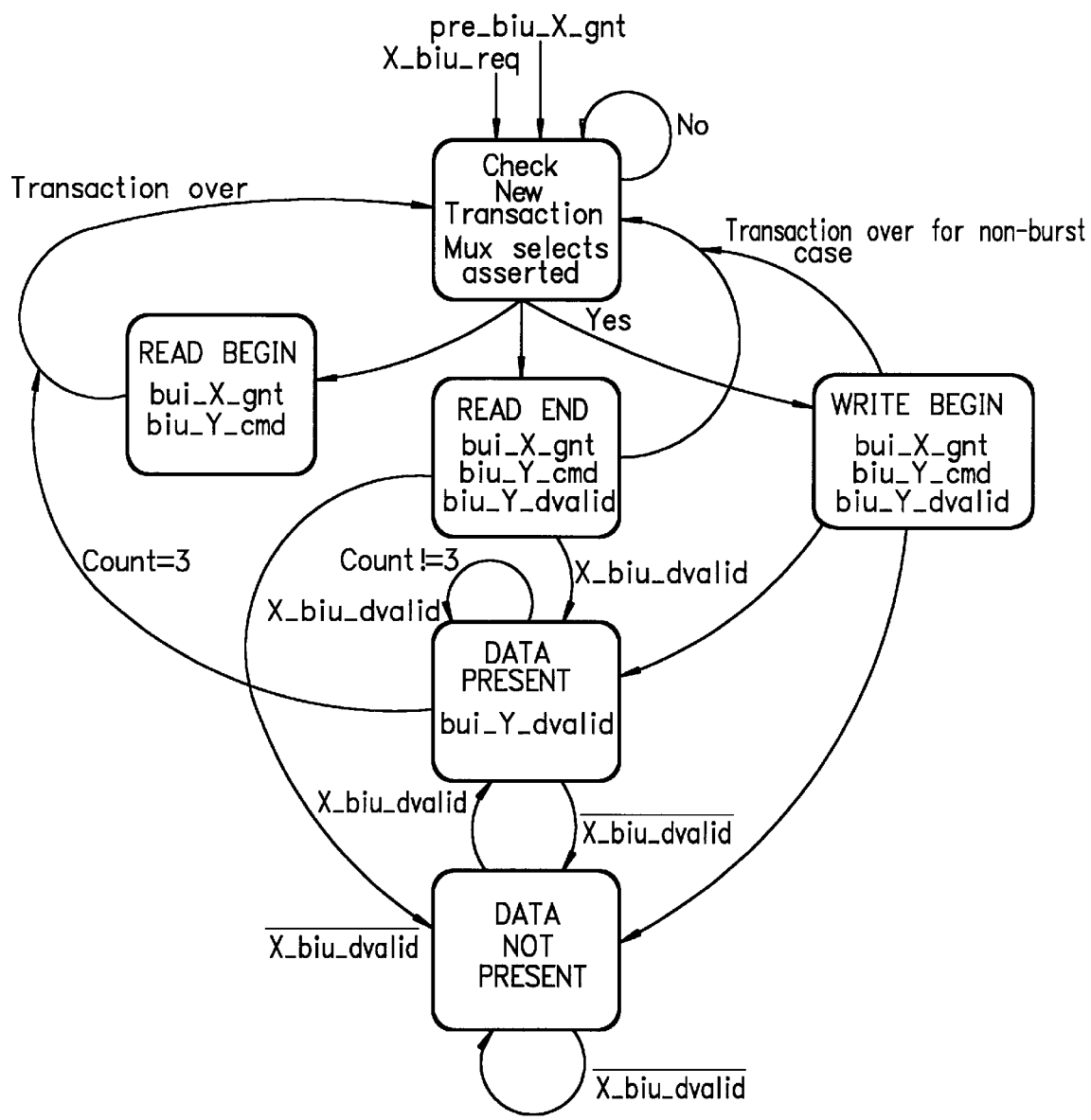
FIG. 4 depicts a state machine according to an embodiment of the bus interface unit of FIG. 2.

FIG. 3 illustrates one example of the above described two-level priority scheme, where the polling sequence of the level 1 module units, i.e., units 12–19, is LSU1→ICU0→ICU1→GDC→DCU→HSP→PCI→LSU0, as indicated in the first column of the flow chart in FIG. 3. Thus, when the decoded request from the decode stage 11a is forwarded to the arbitration stage 11b, the ASM first determines whether there is present request from the RCU 20. If there is, the ASM provides an RCU pre-grant signal, i.e., PRE_BIU_RCU_GNT, to the control stage 11c. If, on the other hand, there is presently not a request from the RCU 20, request arbitration begins in a round-robin fashion according to the predetermined level 1 sequence shown, for instance, in FIG. 3. As used herein, round-robin refers to a predetermined rotating sequence of values corresponding to the module units 12–20.

As mentioned above, the unit address stored in the latch D1 determines at which point in the predetermined sequence the ASM begins polling. For instance, if the BIU 11 issued a grant to the LSU0 13 on the previous clock cycle, present arbitration polling begins with the next unit in the sequence, i.e., the LSU1 15, as indicated in the first column of the flow chart in FIG. 3. Here, if the LSU1 15 is the initiator of the decoded request received from the decode stage 11a, arbitration is awarded to the LSU1 15 and, in response thereto, an LSU1 pre-grant signal, i.e., PRE_BIU_LSU1_GNT, is provided to the control stage 11c and, as mentioned above, the unit address of the LSU1 15 is stored in the latch D1. If, on the other hand, the decoded request is not initiated by the LSU1 15, the next unit in the sequence is polled, i.e., the ICU0 12. This sequential polling of units 12–20 continues until all units 12–20 are polled. Thereafter, if a match is not found, i.e., there are no requests present, the ASM assumes a default value indicative of the RCU 20 and, in response thereto, grants access of the common buses to the RCU 20 by asserting PRE_BIU_RCU_GNT.

The pre-grant signal (PRE_GNT) asserted by the arbitration stage 11b is received in the control stage 11c. In a preferred embodiment, the control stage 11c includes a Control State Machine CSM having six states as illustrated, for instance, in FIG. 4: Check New Transaction, Read Begin, Read End, Write Begin, Data Present, and Data Not Present. The CSM is preferably clocked by the CPU clock.

The CSM is initially in the Check New Transaction state, during which the CSM awaits a pre-grant signal from the arbitration stage 11b. The CSM decodes the request corresponding to the received pre-grant signal and determines the transaction type, the initiator unit, and the target unit. The CSM then transitions to the state which corresponds to the decoded transaction type, i.e., either the Read Begin state, the Read End state, or the Write Begin state.

When in the Read Begin state, the CSM asserts a grant BIU_X_GNT to the initiator unit, a command BIU_Y_CMD to the target unit, and facilitates the transmission of an address from the initiator unit to the target unit via the BIU 11.

When in either the Read End state or the Write Begin state, the CSM asserts a grant BIU_X_GNT to the initiator unit, a command BIU_Y_CMD to the target unit, and a data valid signal BIU_Y_DVALID to the target unit. Thereafter, the CSM awaits a data valid signal X_BIU_DVALID from the initiator unit. If this data valid signal is asserted, i.e., X_BIU_DVALID, the CSM transitions to the Data Present State and thereafter routes data from the initiator unit to the target unit via the BIU 11. If, on the other hand, this data valid signal is not asserted, i.e., X_BIU_DVALID, the CSM transitions to the Data Not Present state and awaits a data valid signal from the initiator unit. The states of the CSM are discussed in detail below.

Check New Transaction State

Initially, the CSM is in the Check New Transaction state, wherein the signal received from the arbitration stage 11b, PRE_BIU_X_GNT, is decoded to determine the initiator. The request signal corresponding to the initiator, X_BIU_REQ, is latched from the appropriate one of buses 12a–20a into the control stage 11c. As mentioned above, this request is decoded to determine the initiator, the target, and the transaction type. In response thereto, the CSM latches address (ADDR), data (DATA), and/or byte enable signals (BENABLE) from the initiator unit. In some embodiments, the address, data, and byte enable signals received from the winning initiator are latched into a plurality of conventional D-type flip flops, as shown for instance in FIG. 5. Preferably, incoming data is latched using the data valid signal from the initiator (X_BIU_DVALID) as a strobe. The CSM then transitions to the state which corresponds to the transaction type requested, i.e., either the Read Begin, Read End, or Write Begin state. If no requests have been asserted, a grant to the RCU 20 is asserted, i.e., PRE_BIU_RCU_GNT, and the CSM remains in the Check New Transaction state.

Read Begin State

Figure 6A:
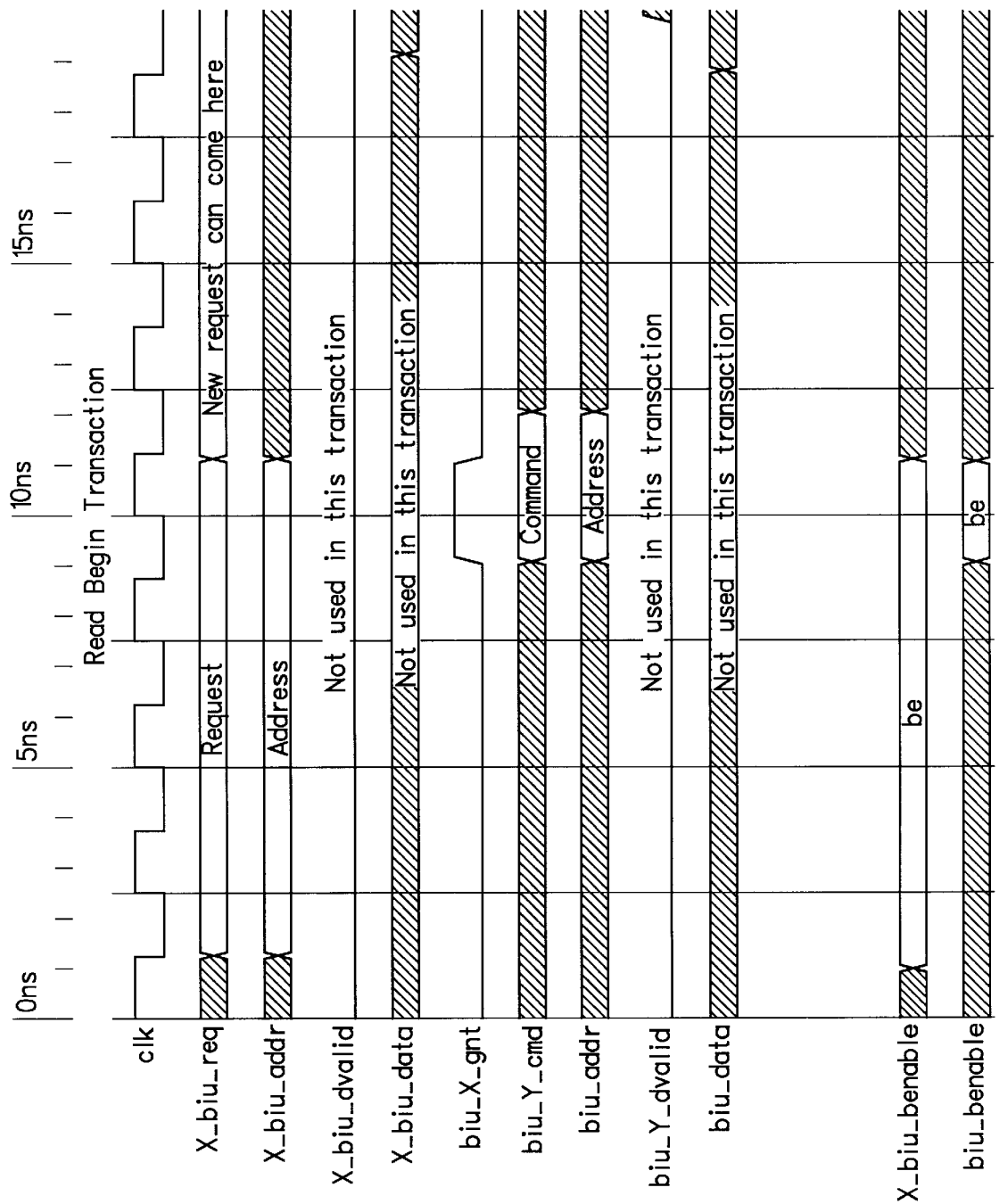
FIGS. 6A–6D are timing diagrams of various signals during Read Begin, Read End, Write Begin burst mode, and Write Begin non-burst mode transactions, respectively, used by the bus interface unit of FIG. 2.

The Read Begin state is described with reference to the timing diagram of FIG. 6A. As mentioned above and shown in FIG. 6A, during the Check New Transaction state, the initiator unit provides a request X_BIU_REQ and an address X_BIU_ADDR to the BIU 11 between $t_0$ and $t_5$. Once in the Read Begin state, the CSM issues a grant to the initiator unit (BIU_X_GNT) and a command to the target unit (BIU_Y_CMD) for one clock cycle at $t_4$. These signals are preferably transmitted to the initiator and target units using appropriate dedicated buses 12b–20b, as illustrated in FIG. 2. The address provided by the initiator unit (X_BIU_ADDR), which was latched within the BIU 11 during the previous CSM state, is also forwarded to the common address bus 22 as signal BIU_ADDR and thereafter latched within the target unit at $t_4$. On the following clock cycle, the CSM returns to the Check New Transaction state and awaits a new pre-grant from the arbitration stage 11b.

As mentioned above, where the PCI 18 or either of the LSUs 13 or 15 initiate a Read Begin transaction, a byte enable signal X_BIU_BENABLE is transmitted to the BIU 11 via the appropriate dedicated bus 12a–20a between $t_0$ and $t_5$. The byte enable signal specifies which byte(s) within the addressed line the initiator desires. In this case, the CSM forwards the byte enable information BIU_BENABLE to the target via the common byte enable bus 24 at $t_4$.

Read End State

Figure 6B:
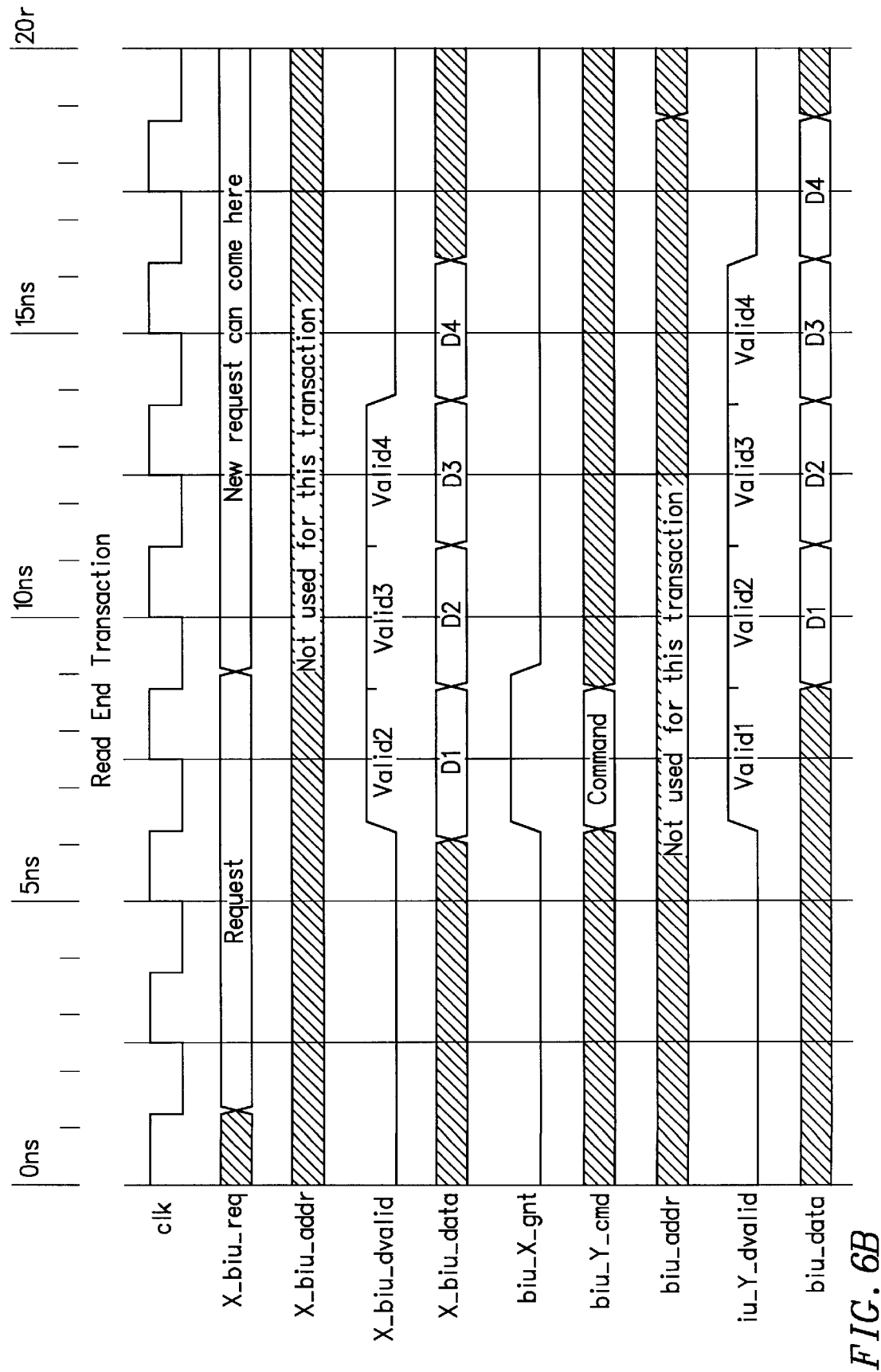

The Read End state is described with reference to the timing diagram of FIG. 6B. As mentioned above and shown in FIG. 6B, during the Check New Transaction state, the initiator unit provides a request X_BIU_REQ to the BIU 11 between $t_0$ and $t_4$ and provides a first data signal X_BIU_DVALID and first data X_BIU_DATA to the BIU 11 at $t_3$. Once in the Read End state, the CSM issues a grant to the initiator unit (BIU_X_GNT), a command to the target unit(BIU_Y_CMD), and a data valid signal to the target unit (BIU_Y_DVALID) for one clock cycle at $t_3$. The first data provided by the initiator (X_BIU_DATA), which was latched within the BIU 11 during the previous CSM state, is forwarded to the common data bus 23 as signal BIU_DATA and thereafter latched within the target unit at $t_4$. For a non-burst transaction, the transaction is considered over and the CSM returns to the Check New Transaction state and awaits the next pre-grant from the arbitration stage 11b. If, on the other hand, the X_BIU_DVALID signal is asserted, the CSM transitions to the Data Present state, a description of which is provided below.

In the event that the transaction involves a cache miss, i.e., where the RCU 20 is requesting a Read End transaction, the ready lines of both the DCU 14 and the initiating LSU (i.e., DCU_BIU_BRDY and LSUn_BIU_BRDY) are checked before the RCU request is granted. Here, if both the DCU 14 and the initiating LSUn units are ready, the grant (BIU_

RCU_GNT) is asserted. Data valid signals are transmitted to the DCU 14 and the appropriate LSUn (BIU_Y_DVALID) contemporaneously with the assertion of the command signal (BIU_Y_CMD) to the target. Thereafter, the data valid signal from the initiator (X_BIU_DVALID) is monitored to determine if the initiator is sending additional data bytes. If so, the CSM transitions to the Data Present state. Otherwise, the CSM transitions to the Data Not Present state.

Write Begin State

Figure 6C:
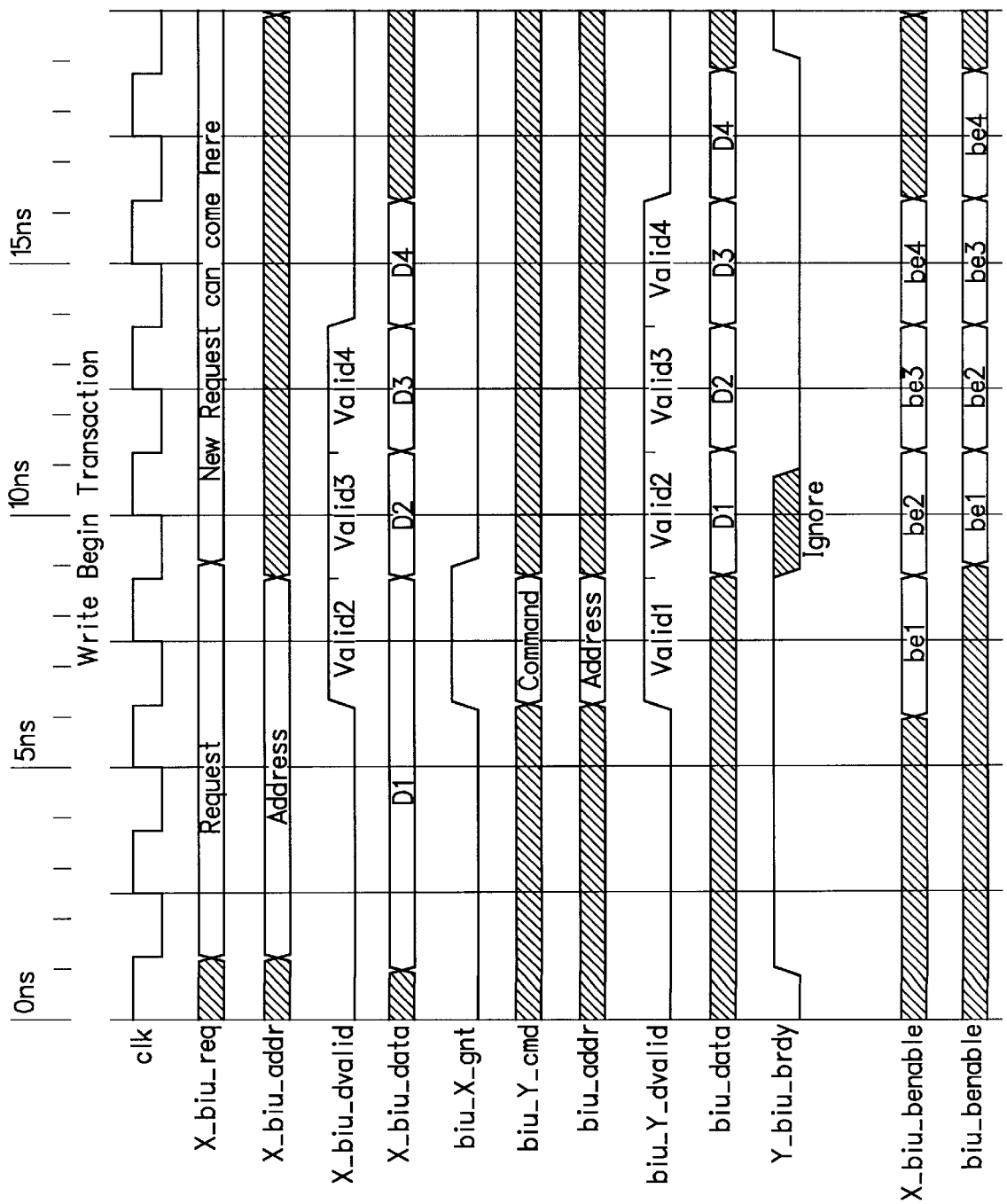
Figure 6D:
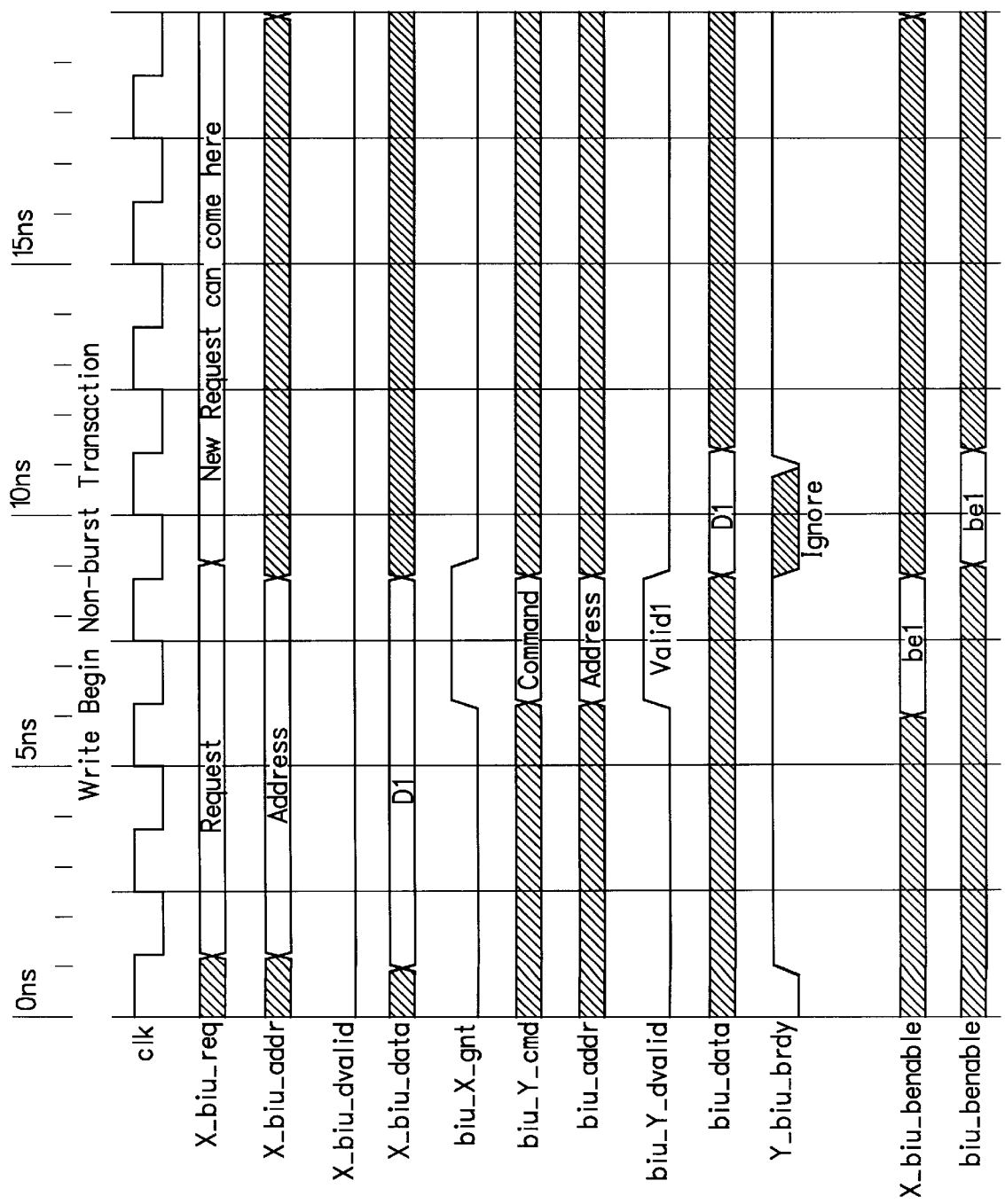

The Write Begin state is described with reference to the timing diagrams of FIG. 6C and 6D. As mentioned above and shown in FIGS. 6C and 6D, during the Check New Transaction state, the initiator unit provides a request X_BIU_REQ and an address X_BIU_ADDR to the BIU 11 between $t_0$ and $t_4$ and begins providing data X_BIU_DATA to the BIU 11 between $t_0$ and $t_1$. Once in the Write Begin state, the CSM asserts a grant (BIU_X_GNT) to the initiator unit, and asserts the command (BIU_Y_CMD) and data valid signal (BIU_Y_DVALID) to the target unit at $t_3$, as described above. The BIU 11 also routes the address (BIU_ADDR) from the initiator to the common address bus 22 (and thereafter to the target unit) at $t_3$. If the data valid signal from the initiator (X_BIU_DVALID) is asserted, the CSM transitions to the Data Present State (Figure 6C). Otherwise, the CSM transitions to the Data Not Present State. In the case of a non-burst transaction, the transaction is considered completed (FIG. 6D), and the CSM transitions to the Check New Transaction state and thereby awaits the next pre-grant signal from the arbitration stage 11b.

As mentioned above, if the PCI 18 or either of the LSUs 13 and 15 request a Write Begin, the initiator sends a byte enable signal to the BIU via the appropriate dedicated bus 12a–20a. Thereafter, the BIU 11 forwards the byte enable signal to the target via the common byte enable bus 24.

If the either of the LSUs initiates a Write Begin, it sends one data byte to either the RCU 20 or the PCI 18 via the BIU 11 in the manner described above. Thereafter, the CSM transitions to the Check New Transaction state. When the DCU 14 requests a Write Begin transaction, the ready lines of the RCU 20 and both ICUs 12 and 16 (i.e., RCU_BIU_BRDY, ICU0_BIU_BRDY, and ICU1_BIU_BRDY) must be asserted before the grant signal (BIU_DCU_GNT) is asserted by the BIU 11.

Data Present State

As mentioned above, the Data Present state is reached only if the data valid signal from the initiator (X_BIU_DVALID) is asserted during the previous state. Once in the Data Present state, the data valid signal to the target (BIU_Y_DVALID) is asserted for one clock cycle, thereby allowing data on the common data bus 23 to be latched into the target unit. This event corresponds with $t_3$ in FIG. 6B for Read End transactions and with $t_3$ in FIGS. 6C and 6D for Write Begin transactions. The data valid signal from the initiator is checked on the following clock cycle and, if asserted, the CSM remains in the Data Present State and the next data is forwarded to the common data bus (BIU_DATA). This event corresponds with $t_4$ in FIG. 6B for Read End transactions and $t_4$ in FIG. 6C for a burst mode Write Begin transaction. Otherwise, the CSM transitions to the Data Not Present state.

A count of the data valid signal from the initiator (X_BIU_DVALID) is maintained within the BIU 11. When this count reaches a predetermined value, which in a preferred embodiments is three, the CSM transitions to the Check New Transaction state. When the DCU 14 requests a Write Begin transaction, the RCU 20 and both ICUs 12 and 16 receive data valid signals.

Data Not Present State

As noted above, the Data Not Present state is reached only if X_BIU_DVALID is deasserted during the Data Present state. Here, the data valid signal to target (BIU_Y_DVALID) is deasserted for one clock cycle, thereby informing the target that data is not presently available on the common data bus 23. The data valid signal from the initiator (X_BIU_DVALID) is monitored and, if re-asserted, the CSM transitions to the Data Present state. Otherwise, the CSM remains in the Data Not Present state.

Present embodiments may be better understood in light of an example request where, for instance, the LSU0 13 requests data from the RCU 20. Here, the LSU0 13 asserts a request to the BIU 11 as signal LSU0_BIU_REQ via bus 13a. The LSU0 13 also sends a byte enable signal (LSU0_BIU_BENABLE) to the BIU via bus 13a. The request is decoded in the decode stage 11a of the BIU 11 to determine the transaction type, i.e., Read Begin, and the target, i.e., the RCU 20. Thereafter, the ready line from the RCU 20 (RCU_BIU_BRDY) is checked to ensure that the RCU 20 is ready to receive a command. If the ready signal RCU_BIU_BRDY is asserted, the decoded request is forwarded to the arbitration stage 11b.

The ASM within the arbitration stage 11b arbitrates among the present requests as described above. Thus, if the RCU 20 has not asserted a request, the ASM polls the units 12–19 according to, for instance, the predetermined sequence shown in FIG. 3. Assuming there are no other requests, the ASM provides an LSU0 pre-grant signal (PRE_BIU_LSU0_GNT) to the control stage 11c. As noted above, the CSM is initially in the Check New Transaction state. In response to the received pre-grant signal (PRE_BIU_LSU0_GNT), the request from the LSU0 (LSU0_BIU_REQ) is decoded to determine the transaction type requested (i.e., Read Begin) and the target (i.e., the RCU 20). In response thereto, the CSM transitions to the Read Begin state and asserts a grant to the LSU0 13 (BIU_LSU0_GNT) via bus 13b and a command to the RCU 20 (BIU_RCU_CMD) via bus 20b. The CSM enables the address ports connecting the RCU 20 with the common address bus 22 and the common byte enable bus 24, and then provides the address and byte enable specified by the LSU0 13 to the RCU 20 via the common address bus 22 and the common byte enable bus 24, respectively.

Once the address and byte enable signal of the data are forwarded to the RCU 20, the RCU 20 requests a Read End transaction from the BIU 11 in order to provide the requested data to the LSU0 13. Present requests are then arbitrated within the BIU 11 as described above. Simultaneous with granting the request to the RCU 20 via dedicated bus 20b (BIU_RCU_GNT), the BIU 11 asserts a command to the LSU0 13 (BIU_LSU0_CMD) via dedicated bus 13b, and also enables the data ports which connect the LSU0 13 with the common data bus 23. The BIU 11 also asserts a data valid signal to the LSU0 13, i.e., BIU_LSU0_DVALID. Thus, the requested data is routed from the RCU 20 to the BIU 11 via dedicated bus 20a and latched within the BIU 11 using the RCU 20's data valid signal (RCU_BIU_DVALID) as a strobe. The data is then forwarded to the LSU0 13 via the common data bus 23.

Figure 5:
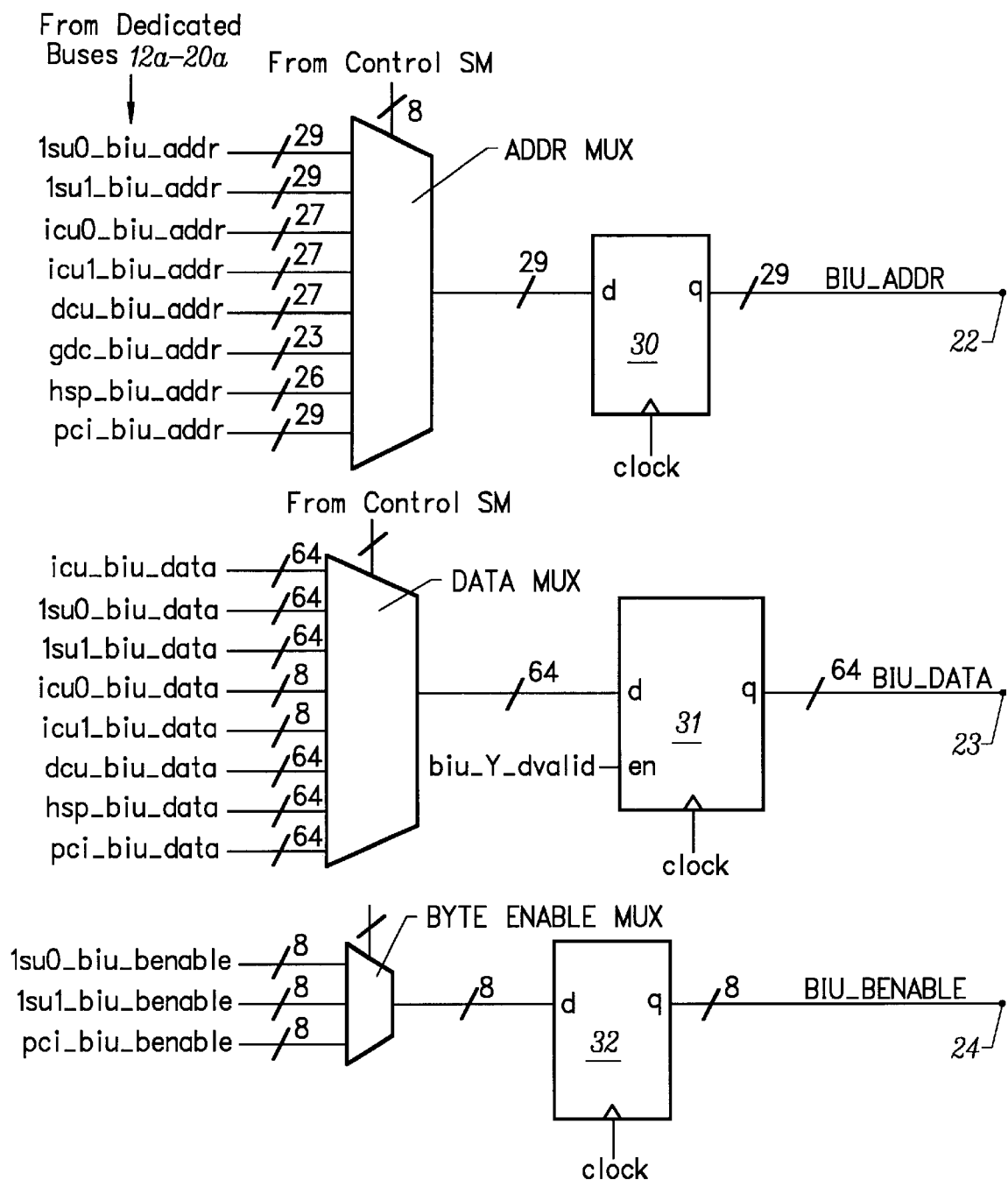
FIG. 5 is a block diagram illustrating address, data, and byte enable data paths employed by the bus interface unit of FIG. 2.

FIG. 5 shows, in a preferred embodiment, specific address, data, and byte enable signals received in the BIU 11 from units 12–20 via respective buses 12a–20a. For instance, the address lines from each of the dedicated unit-to-BIU buses 12a–20a are connected to input terminals of an address multiplexer ADDR MUX within the BIU 11. In response to a select signal asserted by the CSM during its Check New Transaction state, the ADDR MUX provides one of the addresses received from units 12–20 (X_BIU_ ADDR) to the data terminal of a D-type flip flop 30. The flip flop 30 is clocked by the CPU clock and provides the selected address (BIU_ADDR) to the common address bus 22. Latching the address within the BIU 11 ensures that there are no critical timing delays associated with driving the address from the initiator to the target through the BIU 11. The data and byte enable signals from units 12–20 are processed within the BIU 11 in a similar manner. Further, although the embodiment of FIG. 5 is shown as allowing only three of units 12–20 to assert byte enable signals (BENABLE), i.e., the LSU0 13, the LSU1 15, and the PCI 18, other embodiments may allow a greater number of units 12–20 to assert byte enable signals, as may be required by particular implementations.

Figure 7:
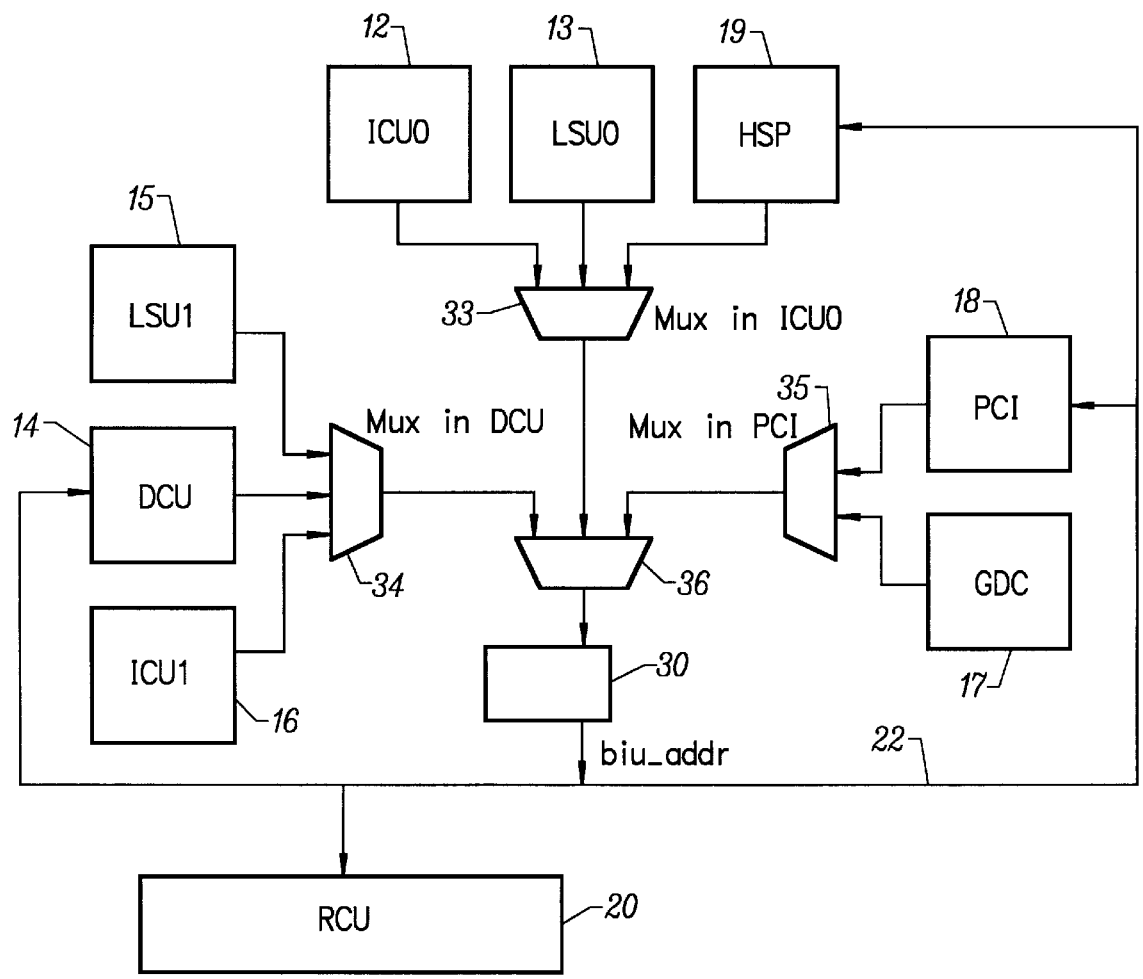
FIG. 7 is a block diagram illustrating address multiplexing according to one embodiment of the bus interface unit of FIG. 2.

In order to conserve die area, the address, data, and byte enable multiplexers (ADDR MUX, DATA MUX, and BENABLE MUX, respectively) discussed above may be arranged in groups of two or three. FIG. 7 illustrates a possible implementation with respect to the address multiplexers ADDR MUX, where the address lines from the ICU0 12, LSU0 13, and the HSP 19 are multiplexed in a MUX 33 within the ICU0 12, the address lines from the DCU 14, the LSU1 15, and the ICU1 16 are multiplexed in a MUX 34 within the DCU 14, and the address lines from the GDC 17 and the PCI 18 are multiplexed in a MUX 35 within the PCI 18. The output signals from MUXes 33–35 are, in turn, multiplexed in a MUX 36 within the BIU 11 and then latched in, for instance, the flip flop(s) 30 of FIG. 5. Inputs to MUXes 33–36 are selected by the CSM as described above. In this manner, the address indicated in the granted request is provided to the target via the common address bus 22. The data and byte enable signals from the module units 12–20 may be multiplexed in a similar manner.

Present embodiments are advantageous over conventional CPU bus systems in several respects. First, as mentioned above, conventional bus control systems employ tri-state I/O drivers within the CPU module units to control access to the common buses. The time required to switch these drivers between states, which is typically between one and two CPU clock cycles, undesirably limits CPU performance. In contrast, present embodiments do not use such tri-state drivers within the CPU module units 12–20 but rather, as discussed above, employ a bus interface unit 11 to control information flow between the module units 12–20. In present embodiments, address, data, and byte enable signals are transmitted from the module units 12–20 to the BIU 11 via respective dedicated buses 12a–20a, and address, data, and byte enable signals are transmitted from the BIU 11 to the module units 12–20 via respective common buses 22–24. Further, since the dedicated buses 12a–20a and common buses 22–24 are unidirectional, the transmission of information between CPU module units 12–20 in accordance with present embodiments does not require any turn around time, thereby further improving CPU performance.

Second, the BIU 11 arbitrates transactions using a two-level priority scheme, where the first level includes the RCU 20, and the second level, which is of a lower priority than the first level, includes a round-robin rotation of the module units in a predetermine sequence. Further, as mentioned above, when there are no present requests, the ASM defaults to the RCU 20. Since the BIU 11 asserts a grant on every CPU clock cycle, the RCU 20 is given priority access to the common buses 22–24 on every clock cycle, thereby reducing, and in some embodiments even eliminating, the need for time consuming interrupt commands. Further, arbitrating among the level 1 units, i.e., units 12–19, in a predetermined sequence, as well as beginning such arbitration with the unit following the previous arbitration winner in the predetermined sequence, ensures fairness in arbitrating among units 12–19. This novel arbitration system advantageously provides a fair arbitration of requests from module units 12–19 while ensuring that requests from the RDRAM control unit 20 are satisfied within one CPU clock cycle.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

We claim:

1. A central processing unit of a computer, comprising:
   a bus interface unit having a plurality of first ports and a second port;
   a plurality of module units each having a first port and a second port;
   a plurality of dedicated buses each connecting said first port of corresponding modules units to said respective first ports of said bus interface unit; and
   a common bus having a first port coupled to said second port of said bus interface unit and having an plurality of second ports connected to said second ports of said respective module units, wherein during a transaction request in which an initiator module unit desires to communicate information with a target module unit, said information is forwarded from said first module unit via said dedicated bus to said bus interface unit which, in turn, forwards said information to said second module unit via said common bus.

2. The apparatus of claim 1, wherein said common bus comprises a common address bus and a common data bus.

3. The apparatus of claim 1, wherein said common bus comprises a unidirectional bus.

4. The apparatus of claim 1, wherein said first and second ports of said bus interface unit comprise input/output ports and an output port, respectively.

5. The apparatus of claim 4, wherein said first and second ports of said common bus comprise input and output ports, respectively.

6. The apparatus of claim 1, wherein said module units comprise load/store units, instruction caches, data caches, a PCI interface unit, and/or a memory control unit.

7. The apparatus of claim 6, wherein said module units further comprise a geometric decompression unit.

8. The apparatus of claim 7, wherein said module units further comprise a high speed packet port interface.

9. The apparatus of claim 1, further comprising one or more multiplexers having input terminals coupled to receive signals from said module units via said dedicated buses and having control terminals coupled to receive select signals from said bus interface unit, where in response to said select signals, said one or more multiplexers provide one of said signals to said common bus.

10. The apparatus of claim 9, wherein said one or more multiplexers are housed within said bus interface unit.

11. The apparatus of claim 9, wherein during said transaction request a request signal from said first module unit is decoded to determine the type of said requested transaction and the respective addresses of said first and second module units.

12. The apparatus of claim 1, wherein said bus interface unit comprises a decode stage, an arbitration stage, and a control stage.

13. A method of controlling communication in a central processing unit of a computer, said method comprising the steps of:

sending a request from an initiator module unit in said central processing unit to a bus interface unit in said central processing unit, said request specifying a transaction type and a target unit in said central processing unit;

determining from said request said transaction type and said target unit;

sending from said bus interface unit a grant signal to said initiator module unit and a command signal to said target module unit in response to said determining step;

transmitting information from said initiator module unit to said bus interface unit in response to said grant signal; and transmitting said information from said bus interface unit to said target module unit.

14. The method of claim 13, wherein said information is latched within said bus interface unit.

15. The method of claim 13, further comprising the step of sending a ready signal from said target module unit to said bus interface unit.

16. The method of claim 15, further comprising the step of gating said request signal from said initiator module unit with said ready signal from said target module unit.

17. The method of claim 13, further comprising the step of:

after said determining step, arbitrating said request with other requests received from other module units.

18. The method of claim 13, wherein said information comprises an address.

19. The method of claim 13, wherein said information comprises a byte enable signal.

20. The method of claim 13, wherein said information comprises data.

21. The method of claim 20, further comprising the step of:

sending a data valid signal from said initiator module unit to said bus interface unit.

22. The method of claim 21, wherein said information is clocked into said bus interface unit according to said data valid signal.

23. The method of claim 21, further comprising the step of sending said data valid signal from said bus interface unit to said target module unit.

24. The method of claim 23, wherein said data valid signal and said command signal are simultaneously sent from said bus interface unit to said target module unit via respective first and second dedicated unidirectional buses extending therebetween.

25. The method of claim 13, wherein said request is sent from said initiator module unit to said bus interface unit via a first dedicated unidirectional bus therebetween.

26. The method of claim 25, wherein said grant signal is sent from said bus interface unit to said initiator module unit via a second dedicated unidirectional bus therebetween.

27. The method of claim 13, wherein said information is sent from said initiator module unit to said bus interface unit via a dedicated unidirectional bus therebetween.

28. The method of claim 13, wherein said information is sent from said bus interface unit to said target unit via a common unidirectional bus extending between said bus interface unit and said module units.

29. The method of claim 13, wherein said request, said command, and said information are sent from said bus interface unit to said module units via multiple buses therebetween.

* * * * *